United States Patent
Lanta

(10) Patent No.: US 8,610,569 B2
(45) Date of Patent: Dec. 17, 2013

(54) CHILD SEAT STATUS CHECKER AND POWER SUPPLY

(75) Inventor: Joshua Lanta, Chur (CH)

(73) Assignee: Polycontact AG, Chur (CH)

( * ) Notice: Subject to any disclaimer, the term of this patent is extended or adjusted under 35 U.S.C. 154(b) by 45 days.

(21) Appl. No.: 13/356,264

(22) Filed: Jan. 23, 2012

(65) Prior Publication Data

US 2012/0187730 A1   Jul. 26, 2012

(30) Foreign Application Priority Data

Jan. 24, 2011   (DE) .................. 10 2011 009 263

(51) Int. Cl.
   *G08B 21/00*   (2006.01)
(52) U.S. Cl.
   USPC ............................ 340/540; 340/667; 180/272
(58) Field of Classification Search
   USPC .............. 340/540, 438, 457, 522, 573.1, 667; 180/271, 272
   See application file for complete search history.

(56) References Cited

U.S. PATENT DOCUMENTS

| | | | |
|---|---|---|---|
| 6,922,147 B1 * | 7/2005 | Viksnins et al. | 340/573.1 |
| 6,998,988 B1 * | 2/2006 | Kalce | 340/573.1 |
| 7,218,218 B1 * | 5/2007 | Rogers | 340/522 |
| 7,250,869 B2 * | 7/2007 | Davis | 340/573.1 |
| 7,378,974 B1 * | 5/2008 | Bassett et al. | 340/573.1 |
| 7,410,214 B2 * | 8/2008 | Hayden et al. | 297/253 |
| 8,038,213 B2 * | 10/2011 | Owens | 297/250.1 |
| 8,058,983 B1 * | 11/2011 | Davisson et al. | 340/457 |
| 8,063,788 B1 * | 11/2011 | Morningstar | 340/667 |
| 8,179,274 B2 * | 5/2012 | Rork et al. | 340/667 |
| 8,408,156 B2 * | 4/2013 | Banda | 116/28 R |
| 2008/0119989 A1 | 5/2008 | Henning et al. | |
| 2013/0049955 A1 * | 2/2013 | Hoover et al. | 340/539.11 |

* cited by examiner

*Primary Examiner* — John A Tweel, Jr.
(74) *Attorney, Agent, or Firm* — Dorsey & Whitney LLP

(57) ABSTRACT

An exemplary device can be provided for monitoring a child seat in a vehicle. The exemplary device can include seat electronics attachable to the child seat, and a transmitter configured to transfer first signals from the seat electronics to vehicle electronics and configured to transfer energy and second signals from the vehicle to the seat electronics. Additionally, the transmitter can be attachable to an anchor point configured to fasten the child seat to the vehicle.

7 Claims, 1 Drawing Sheet

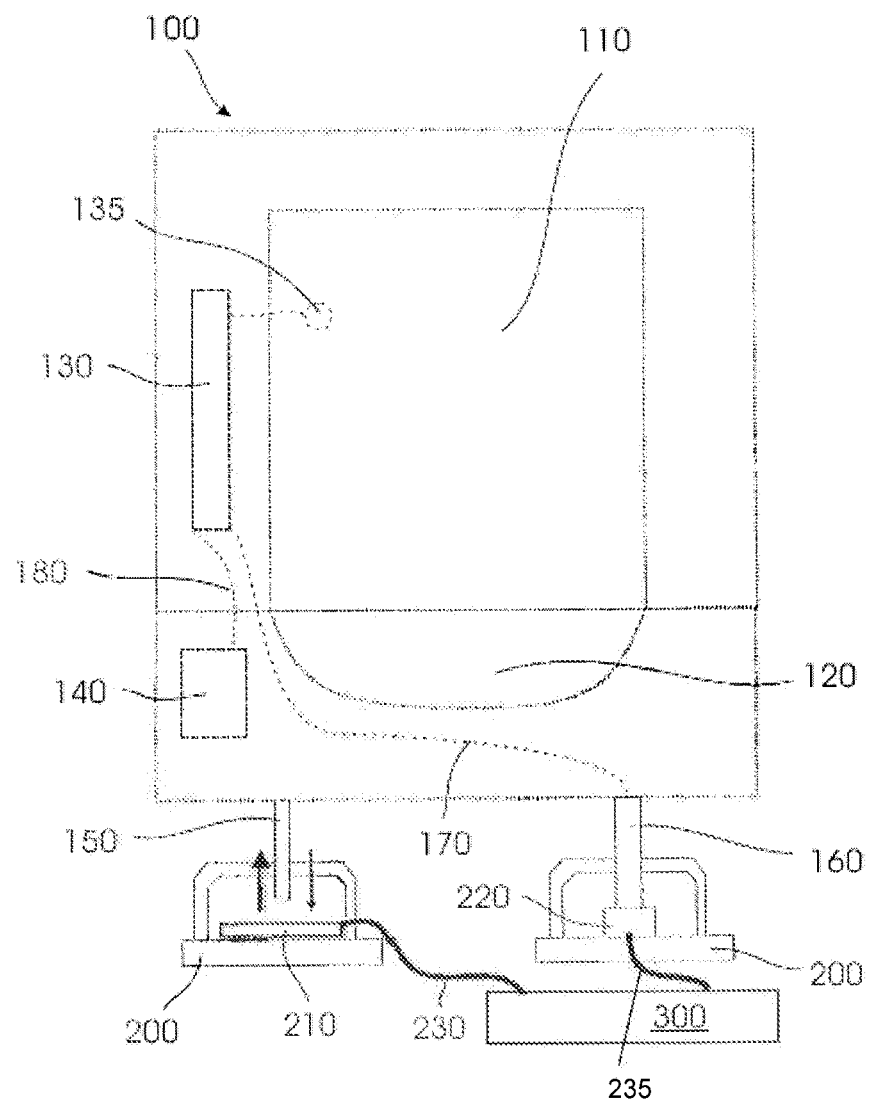

CHILD SEAT STATUS CHECKER AND POWER SUPPLY

CROSS-REFERENCE TO PRIOR APPLICATION(S)

This application claims priority to German Patent Application No. 10 2011 099 263.3, filed on Jan. 24, 2011, the entire disclosure of which is incorporated herein by reference.

FIELD OF THE DISCLOSURE

The present disclosure relates to a device for monitoring a child seat, and in particular, to a configuration which comprises a status sensor and power supply for a child seat.

BACKGROUND INFORMATION

U.S. Patent Publication No. 2008/0119989 A1 describes a device for preventing a child from being inadvertently left behind in a vehicle. The system of this publication includes an electronic system and a sensor at the child seat. Depending on whether the engine of the vehicle is running or not, a check is performed at regular intervals to ascertain whether a child is sitting in the child seat. As soon as it has been determined that a child has been sitting in the child seat for longer than a predetermined period of time with the engine turned off, an alarm is triggered and, if necessary, a signal is sent to a custodian.

SUMMARY OF EXEMPLARY EMBODIMENTS

According to an exemplary embodiment of the present disclosure, an exemplary device, system, or arrangement can be provided that can facilitate a reliable monitoring of a child seat.

According to certain exemplary embodiments of the present disclosure, the exemplary device for monitoring a child seat in a vehicle can include seat electronics and a transmitter. The exemplary seat electronics can be attachable to the child seat, and the exemplary transmitter can be attachable to an anchor point for fastening the child seat to the vehicle.

In one exemplary embodiment, the anchor point at the vehicle can include a so-called ISOFIX anchor point, which can include a metal strap that can be rigidly secured to the vehicle and situated between a seating surface and a backrest of a vehicle seat. This anchor point can engage a corresponding attachment structure of a child seat. According to certain exemplary embodiments of the present disclosure, more than one (e.g., two) anchor points can be provided. The attachment structure at the child seat can, for example, be a variable-length device with multiple (e.g., two) hooks. These hooks can be locked, thereby preventing the hooks from inadvertently detaching from the metal straps.

As used herein, in addition to any plain and ordinary meaning, the term "attachable" can, for example, encompass any type of positioning and installation of seat electronics on or in the child seat. Additionally, the term "attachable" can, for example, encompass any type of positioning and integration of the transmitter on, in or in direct proximity to an anchor point.

The exemplary transmitter can be suitable for transmitting signals from the seat electronics to vehicle electronics, as well as for transmitting energy and signals from the vehicle to the seat electronics. A distinction can be here made between energy transmission, which can take place uniformly and at a high voltage level, and signal transmission, which can take place at a lower voltage level and, for example, alternatingly.

According to certain exemplary embodiments of the present disclosure, the seat electronics can include at least one sensor for acquiring a parameter for a child seat status. For example, such a parameter can include, e.g., a seating surface load, a backrest load, a belt buckle closure state, a belt tension, a vital signs of a child sitting on the child seat, a positioning of the child seat relative to the vehicle, or a child seat attachment to the vehicle.

This can facilitate monitoring, e.g., whether the child seat was securely and correctly positioned at a vehicle seat on the one hand, and whether a child sitting on the seat is buckled in safely on the other. Furthermore, vital signs of a child can be monitored, e.g., a heartbeat, respiration or temperature.

In another exemplary embodiment of the present disclosure, the seat electronics can include an energy storage arrangement to supply energy to the seat electronics. For example, the energy storage arrangement can include, e.g., a battery or accumulator that can be charged via the transmitter.

According to certain exemplary embodiments of the present disclosure, the transmitter can be used for contactless energy and signal transfer between the seat electronics and vehicle electronics.

In order to achieve a reliable energy and signal transfer, a transceiver for the seat electronics can be situated in a rear lower area of the child seat in such a way that the transceiver can be situated adjacent to an anchor point at the vehicle seat and aligned to the transmitter located at or in direct proximity to the anchor point.

According to another exemplary embodiment of the present disclosure, the transmitter can transfer energy and signals by way of a mechanical contact. The mechanical contact can be configured in such a way as to facilitate energy and signal transfer when the attachment element of the child seat has been fastened in a predetermined manner to an anchor point of the vehicle.

When the exemplary child seat has been correctly and securely attached to the vehicle seat, certain exemplary embodiments of the present disclosure can ensure a reliable transfer of energy and signals.

These and other objects, features and advantages of the exemplary embodiment of the present disclosure will become apparent upon reading the following detailed description of the exemplary embodiments of the present disclosure, when taken in conjunction with the appended claims.

BRIEF DESCRIPTION OF THE DRAWING

Further objects, features and advantages of the present disclosure will become apparent from the following detailed description taken in conjunction with the accompanying drawings showing illustrative embodiments of the present disclosure, in which:

FIG. 1 is an illustration of an exemplary child seat according to certain exemplary embodiments of the present disclosure.

Throughout the drawing(s), the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures, as defined by the appended claims.

DETAILED DESCRIPTION OF EXEMPLARY EMBODIMENTS

FIG. 1 shows a diagram of an exemplary child seat 100 with a seating surface 110 and a backrest 120 according to an exemplary embodiment of the present disclosure. FIG. 1 also shows two anchor points 200 and vehicle electronics 300 associated with such exemplary embodiment.

As shown in the exemplary embodiment of FIG. 1, the seating surface 110 of the child seat includes seat electronics 130 and a sensor 135, which can be connected with each other via an electrical conductor. Furthermore, the seat electronics 130 can be connected via an electrical conductor 180 with an energy storage arrangement 140, such as a battery or accumulator.

The seat electronics 130 can be further connected via another electrical conductor 170 to an attachment element 160, which can be formed as a mechanical-electrical contact. When this attachment element 160 is mechanically engaged with an anchor point 200, an electrical connection can be established with the transmitter 220, so that energy and signals can be transferred to the seat electronics 130, and the same or other signals can be transferred from the seat electronics 130 via the electrical conductor 170, the transmitter 220, and an electrical conductor 235 to the vehicle electronics 300.

In another exemplary embodiment of the present disclosure, the seat electronics 130 can be connected with a further transmitter 210 in a contactless manner, e.g., without an electrically conductive element. To this end, the seat electronics 130 and such transmitter 210 can include corresponding coils, which can electromagnetically transfer energy and signals. The signals transferred from the seat electronics 130 to the transmitter 210 can be further relayed to the vehicle electronics 300 via an electrical conductor 230.

The arrows on the left anchor point 200 provided in FIG. 1 symbolically depict the contactless transfer between the transmitter 210 and the seat electronics 130.

Certain exemplary embodiments of the present disclosure can also provide a child seat with only one of the two transmitters 210, 220, even though both are shown in FIG. 1. An exemplary child seat 100 can further be equipped with a transmitter at a single attachment site (e.g., the second attachment site would then include no transmitter). Exemplary embodiments of the present disclosure can include any number and combination of transmitters (e.g., those with an electrically conductive element and those facilitating contactless transmission) disposed at any combination of locations (e.g., attachment sites, anchor points, etc.).

Further, the location of the seat electronics 130 shown in FIG. 1 is not limiting. Indeed, the fact that the exemplary seat electronics 130 shown in FIG. 1 is located in the area of the seating surface 110 does not mean that the seat electronics cannot be provided at some other location in or at the child seat. As described herein, the seat electronics 130 having a contactless connection with the transmitter 210 can be arranged in an area under the backrest in the rear of the child seat so as to facilitate a reliable and easily reproducible energy and signal transfer.

The location of the sensor 135 shown in FIG. 1 is also not limiting. Indeed, the sensor 135 shown in the area of the seating surface 110 or FIG. 1 also does not preclude the sensor from being located in another location at the child seat 100. For example, several sensors can be provided, which can acquire various parameters at the child seat or child in a child seat.

Additionally, FIG. 1 shows only one example for the position of the energy storage arrangement 140. Thus, various other energy and/or data storage arrangements can be implemented.

Depending on the signal relayed to the vehicle electronics 300, a corresponding optical or acoustic signal can be provided to a driver, for example, a green signal for 'all systems OK' and a red signal for 'not all systems are OK'.

While the present disclosure was illustrated and described in detail on the drawings and in the preceding specification, such illustrations and descriptions are intended only as illustrations or examples, and not to be restrictive, so that the present disclosure is not limited by the described embodiments. In the claims, the word "comprising" does not preclude other elements, and the indeterminate article "a(n)" does not rule out a plurality.

Simply, the fact that certain features are specified in various dependent claims does not limit the subject matter of the present disclosure. Combinations of these features can also be used to advantage.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A device for monitoring a child seat in a vehicle, comprising:
   seat electronics attachable to the child seat; and
   a transmitter arrangement configured to transfer first signals from the seat electronics to vehicle electronics and configured to transfer energy and second signals from the vehicle to the seat electronics,
   wherein the transmitter arrangement is attachable to an anchor point that is configured to fasten the child seat to the vehicle.

2. The device of claim 1, wherein the seat electronics comprise a sensor arrangement configured to acquire at least one parameter associated with a child seat status.

3. The device of claim 2, wherein the at least one parameter includes at least one of a seating surface load, a backrest load, a belt buckle closure state, a belt tension, at least one vital sign for a child sitting on the child seat, a positioning of the child seat relative to the vehicle, or an attachment of the child seat to the vehicle.

4. The device of claim 1, wherein the seat electronics includes an energy storage arrangement configured to supply energy to the seat electronics, and wherein the energy storage arrangement is chargeable via the transmitter.

5. The device of claim 1, wherein the transfer of energy and signals is contactless.

6. The device of claim 1, wherein the transfer of energy and signals is provided via a mechanical contact.

7. The device of claim 6, wherein the mechanical contact is configured to facilitate energy and signal transfer when an attachment element of the child seat has been fastened to the anchor point of the vehicle in a predetermined manner.

* * * * *